US006866284B2

(12) United States Patent
Carlsson

(10) Patent No.: US 6,866,284 B2

(45) Date of Patent: Mar. 15, 2005

(54) CRASH ATTENUATOR FOR VEHICLE AND METHOD FOR TRANSPORTING SUCH ATTENUATOR

(75) Inventor: Arne Carlsson, Vålberg (SE)

(73) Assignee: Vägverket, Borlange (SE)

( * ) Notice: Subject to any disclaimer, the term of this patent is extended or adjusted under 35 U.S.C. 154(b) by 4 days.

(21) Appl. No.: 10/275,965

(22) PCT Filed: May 17, 2001

(86) PCT No.: PCT/SE01/01099

§ 371 (c)(1),
(2), (4) Date: Jan. 21, 2003

(87) PCT Pub. No.: WO01/87671

PCT Pub. Date: Nov. 22, 2001

(65) Prior Publication Data

US 2004/0021294 A1 Feb. 5, 2004

(30) Foreign Application Priority Data

May 17, 2000 (SE) .............................................. 0001817
Oct. 24, 2000 (SE) .............................................. 0003851

(51) Int. Cl.[7] ................................................ B60R 19/38

(52) U.S. Cl. ..................... 280/474; 280/460.1; 293/118

(58) Field of Search .............................. 280/460.1, 482, 280/474; 256/13.1; 293/118

(56) References Cited

U.S. PATENT DOCUMENTS

| | | | | | |
|---|---|---|---|---|---|
| 4,635,981 | A | * | 1/1987 | Friton | 293/1 |
| 4,770,420 | A | | 9/1988 | Gottwald et al. | 293/104 |
| 5,199,755 | A | * | 4/1993 | Gertz | 293/120 |
| 5,697,657 | A | | 12/1997 | Unrath, Sr. | 293/118 |
| 5,823,584 | A | | 10/1998 | Carney, III | 293/102 |
| 5,947,452 | A | | 9/1999 | Albritton | 256/13.1 |
| 6,042,135 | A | * | 3/2000 | Ross | 280/456.1 |
| 6,146,835 | A | | 11/2000 | Kieffer et al. | 435/7.1 |
| 6,626,449 | B2 | * | 9/2003 | Hazen | 280/492 |
| 6,659,491 | B2 | * | 12/2003 | Green | 280/423.1 |
| 2002/0180179 | A1 | * | 12/2002 | Krauss | 280/460.1 |

FOREIGN PATENT DOCUMENTS

| | | |
|---|---|---|
| EP | 0 507 496 | 10/1992 |
| FR | 2 729 979 | 8/1996 |

* cited by examiner

*Primary Examiner*—Kevin Hurley
(74) *Attorney, Agent, or Firm*—Jacobson Holman PLLC

(57) ABSTRACT

Impact attenuating device for vehicles with frame side members. The attenuator includes an attenuating part, wheels and a connecting part which connects the device to the vehicle either in an operating position or in a transport position. To be able to transport the attenuator between different roadwork areas easily and in a manner safe for traffic, the impact attenuating device is connected like a trailer to the vehicle when in the transport position.

24 Claims, 15 Drawing Sheets

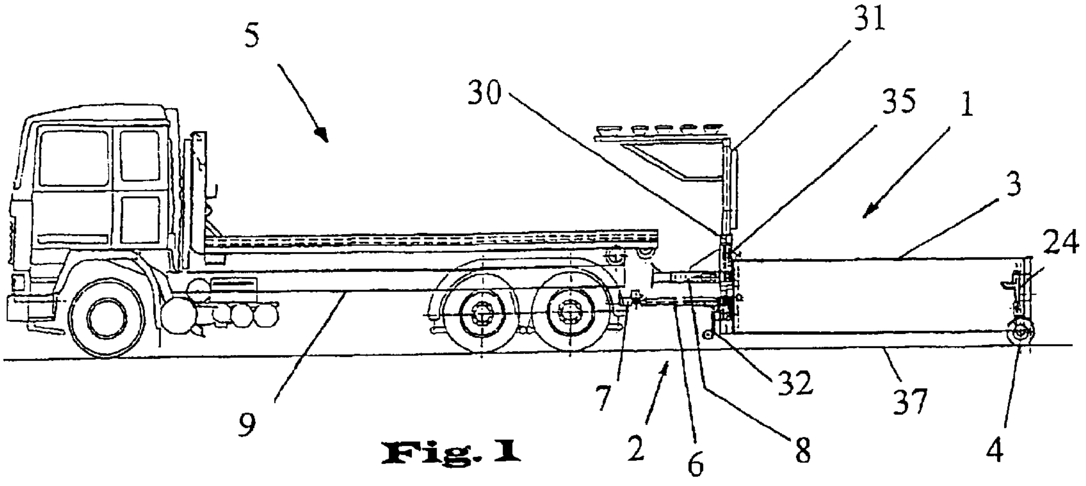
Fig. 1
Fig. 2
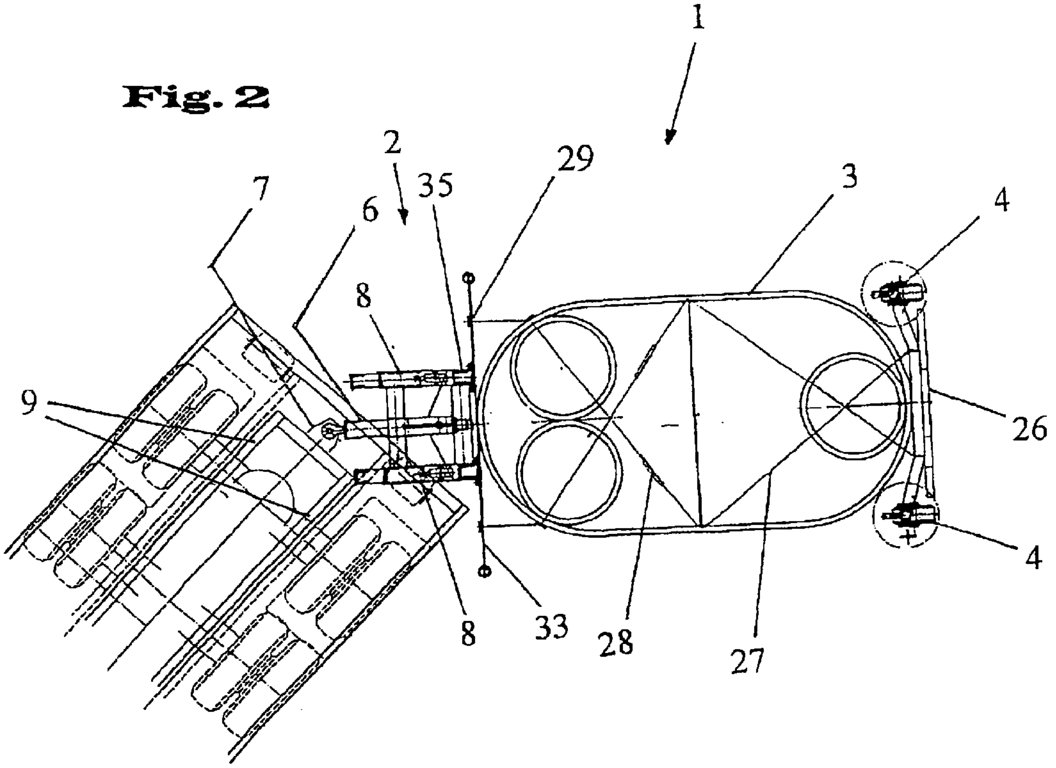

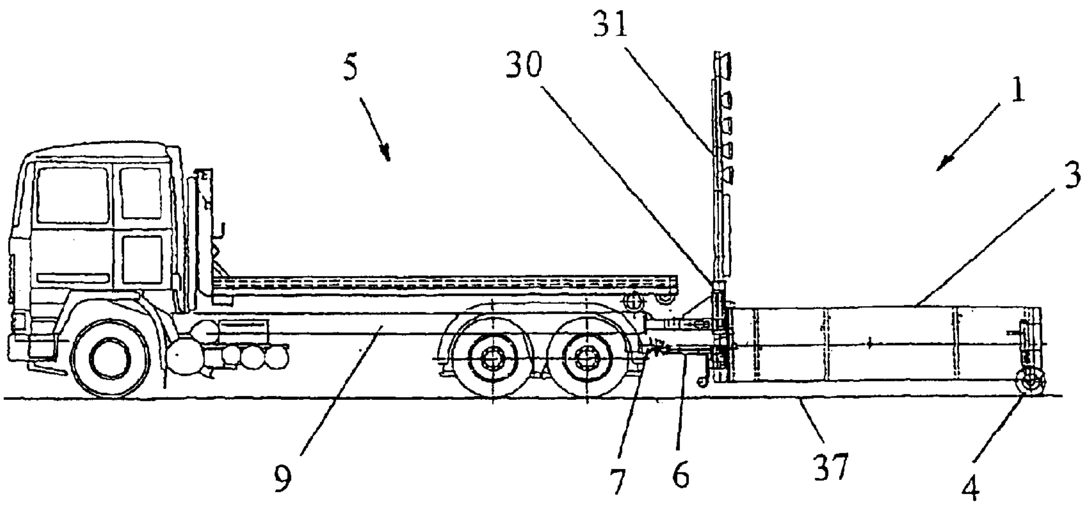
Fig. 3
Fig. 4
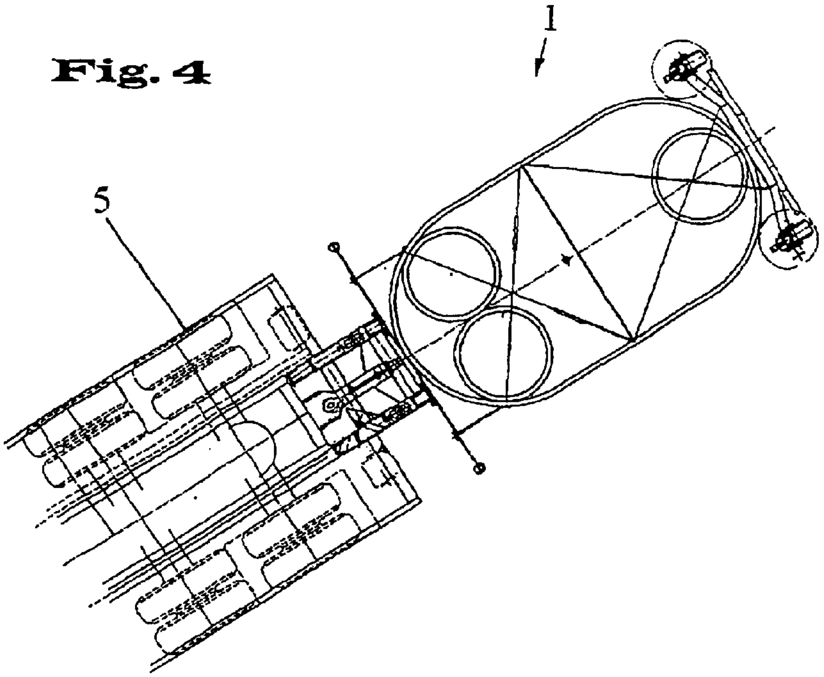

Fig. 5
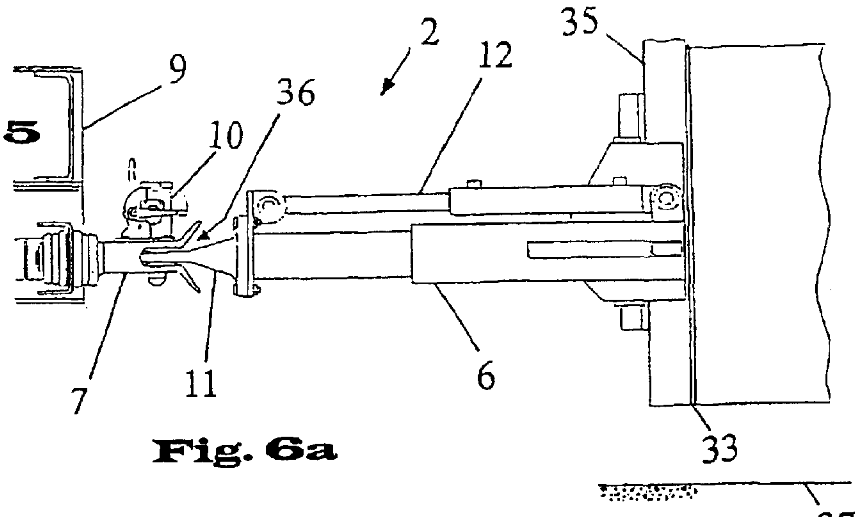
Fig. 6a
A-A
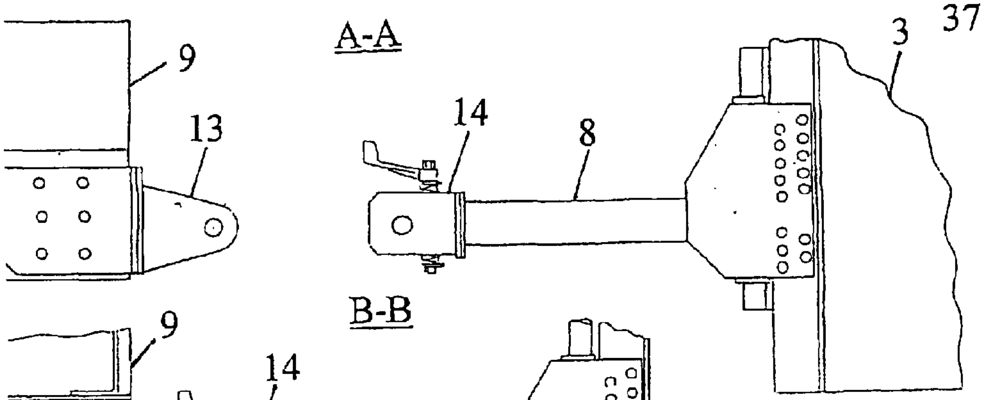
B-B
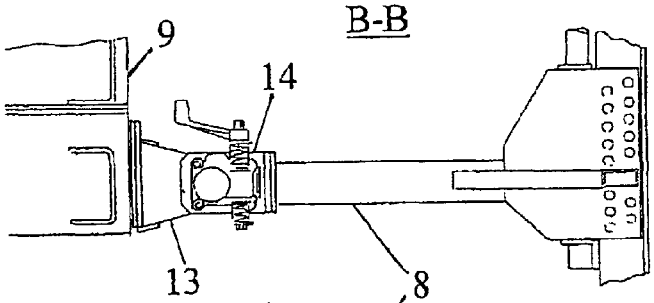
Fig. 6b
Fig.6c
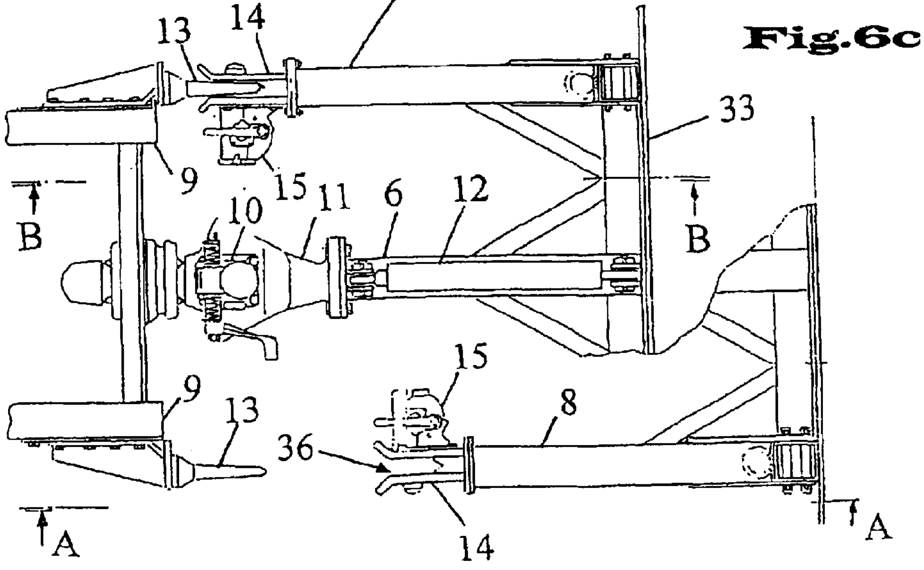

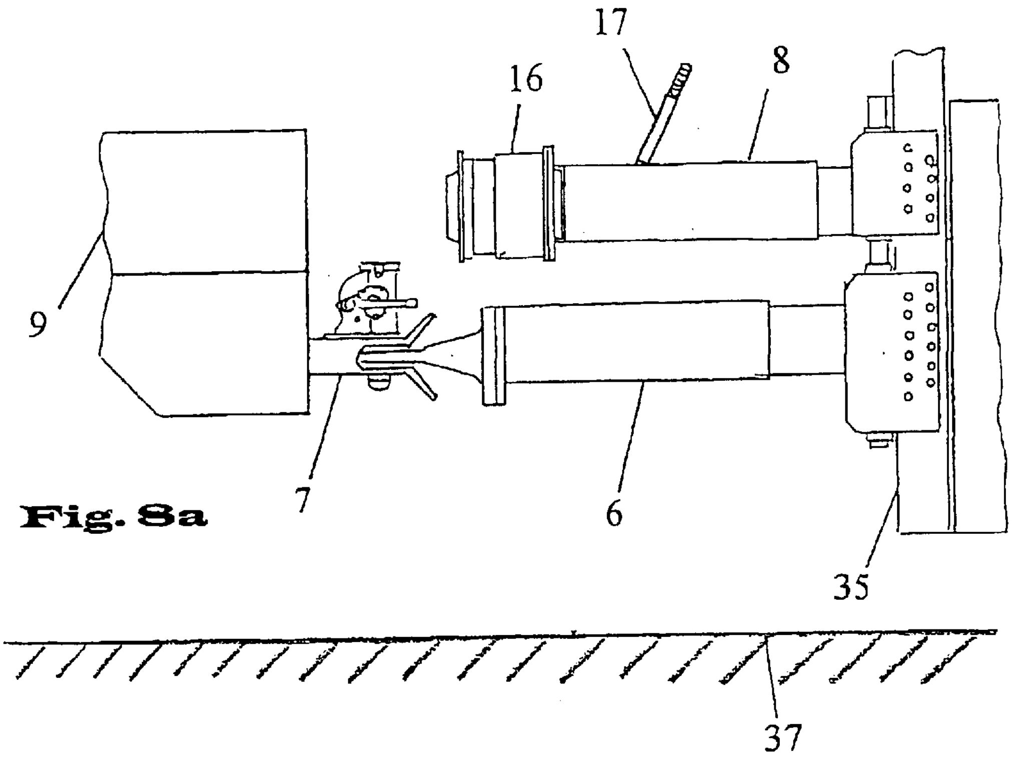
Fig. 8a
Fig. 8b
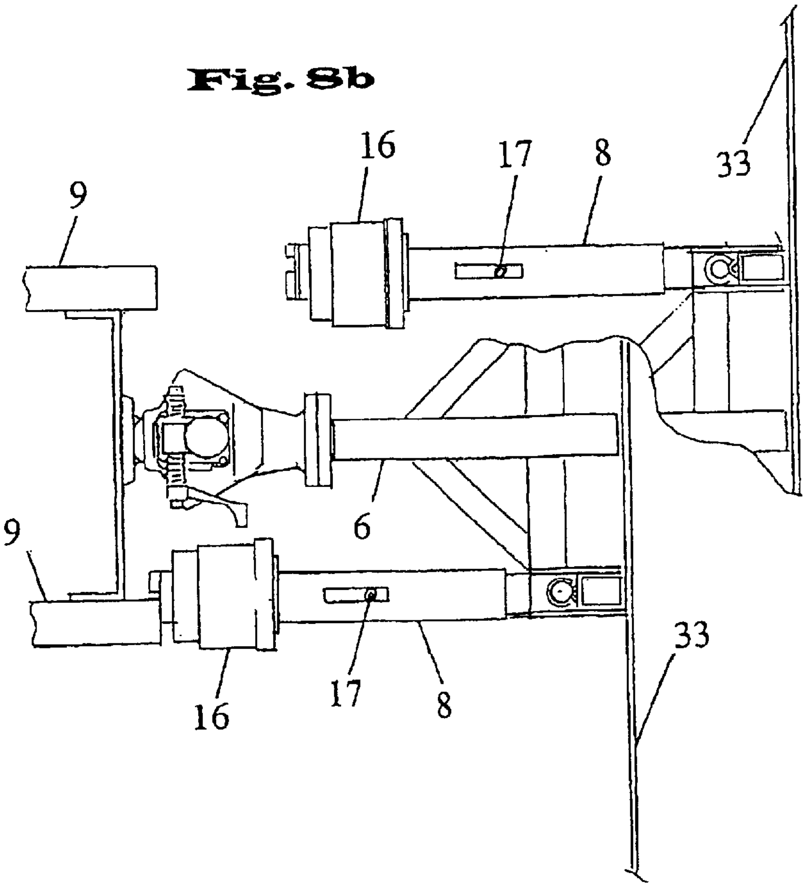

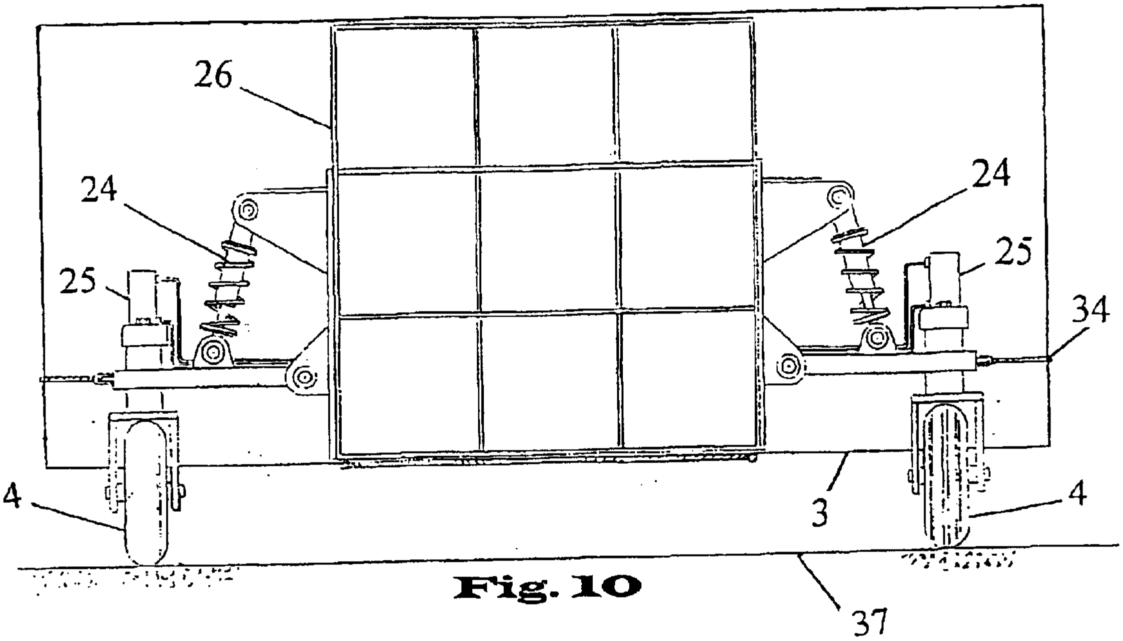
Fig. 10
Fig. 11
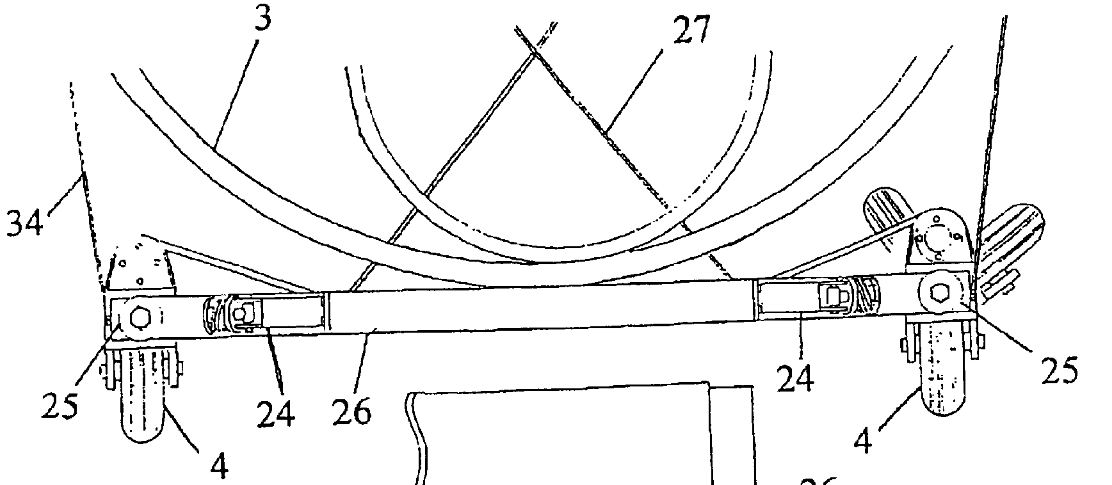
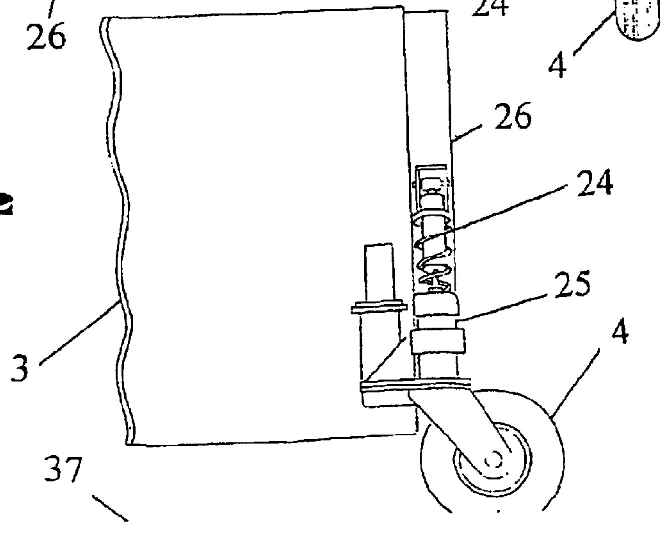
Fig. 12

CRASH ATTENUATOR FOR VEHICLE AND METHOD FOR TRANSPORTING SUCH ATTENUATOR

This is a nationalization of PCT/SE01/01099 filed May 17, 2001 and published in English.

BACKGROUND OF THE INVENTION

1. Field of the Invention

The present invention relates to a crash attenuator or impact attenuating device to be connected to a vehicle with frame side members as well as a method of transporting such a device.

2. Description of the Related Art

Impact attenuating devices of this type are often referred to as TMAs (Truck Mounted Attenuators) or LMCCs (Lorry Mounted Crash Cushions). The device is mounted on a vehicle, usually a lorry, which is then parked along a roadwork area to protect road-users, men at work and equipment. An impact attenuator can also be used in moving roadworks, such as washing of reflecting posts and painting of road markings. The working vehicle moves slowly and sometimes stands still, which may result in unobservant road-users not having time to make way but colliding with the vehicle. The impact attenuator catches the vehicle and attenuates the collision forces by being deformed, for instance by means of metal constructions with deformation zones or elastic constructions of a polymer material.

Impact attenuating devices of this type are known from, inter alia, EP 0 507 496 A1 and U.S. Pat. No. 5,823,584 A. The EP publication discloses a device which is attached to the frame side members of a lorry and an attenuating part which consists of a deformable metal construction. The device is a single-service protection and is scrapped after a collision. The device has a rear part of an elastic material which can take up light impacts without damaging the more expensive attenuating part. During transport, the attenuating part and the rear part are raised by turning through 90 degrees to reduce the overhang and make driving easier. The US publication discloses an attenuating part of an elastic material, which allows it to be reused after a collision. The device is connected to a lorry by means of a plate which is mounted on the lorry and a wire from the rear part of the attenuating part to a stay on the lorry.

A problem in prior-art impact attenuating devices, like those described above, is that it is difficult to transport the attenuators between the roadwork areas. The attenuators are connected to the rear of the vehicle, which makes the distance between the rear axle of the vehicle and the rearmost point of the attenuator, the overhang, long, in most cases several meters. A long overhang causes great problems in sharp bends, intersections, roundabouts etc. As the vehicle turns, the overhang sweeps over a large area outside the vehicle's own lane, and in some traffic environments, it will be difficult to transport the device.

A further problem is that great modifications of the vehicle are necessary for carrying prior-art attenuators. These modifications are not only expensive but also cause an inflexible system where only certain vehicles which have been modified in advance can use attenuators. Using today's system in which contractors are employed to a large extent, it is a great advantage to be able to call in any vehicle whatever and connect an attenuator.

One more problem of prior-art attenuators is that the rear end of the attenuator moves up and down in relation to the roadway depending on the wheels and spring system of the vehicle. When the vehicle runs down into a hole in the road there is a risk that the rear end of the attenuator scrapes against the ground, and when the vehicle passes a hill-top there is a risk that the attenuator is raised to such an extent that a colliding vehicle may be wedged under the attenuator.

SUMMARY OF THE INVENTION

The object of the present invention is to provide an impact attenuating device which solves the above problems. According to the invention, this is achieved by a device comprising an attenuating part, a pair of wheels and a connecting part. The connecting part is arranged to connect the device to the vehicle in an operating position or a transport position. In transport position, the impact attenuating device behaves like a trailer. According to a preferred embodiment of the invention, the connecting part comprises at least two beams for load take-up between the frame side members of the vehicle and the impact attenuating device and an extensible drawbar which is connected to the towing unit of the vehicle.

This results in an impact attenuating device which can be connected to the vehicle without, or with only a small amount of, modifications. Also a vehicle-attenuator combination is provided which can be driven in a safe manner between the roadwork areas and during operation.

BRIEF DESCRIPTION OF THE DRAWINGS

The invention will now be described in more detail with reference to the accompanying drawings:

FIG. 1 shows a vehicle and an impact attenuating device in transport position.

FIG. 2 shows turning in transport position.

FIG. 3 shows the vehicle and the impact attenuating device in operating position.

FIG. 4 shows turning in operating position.

FIG. 5 shows the drawbar.

FIG. 6*a* shows a first embodiment of the coupling device between beams and frame side members in transport position seen from the side, section A—A.

FIG. 6*b* as above, in operating position, section B—B.

FIG. 6*c* is a top plan view of a first embodiment of the coupling device.

FIG. 8*a* is a side view of the second embodiment.

FIG. 8*b* is a top plan view of the second embodiment in transport and operating position.

FIG. 10 is a rear view of the impact attenuating device.

FIG. 11 is a top plan view of the impact attenuating device.

FIG. 12 is a side view of wheels.

DETAILED DESCRIPTION OF THE PREFERRED EMBODIMENTS

Figure 7:
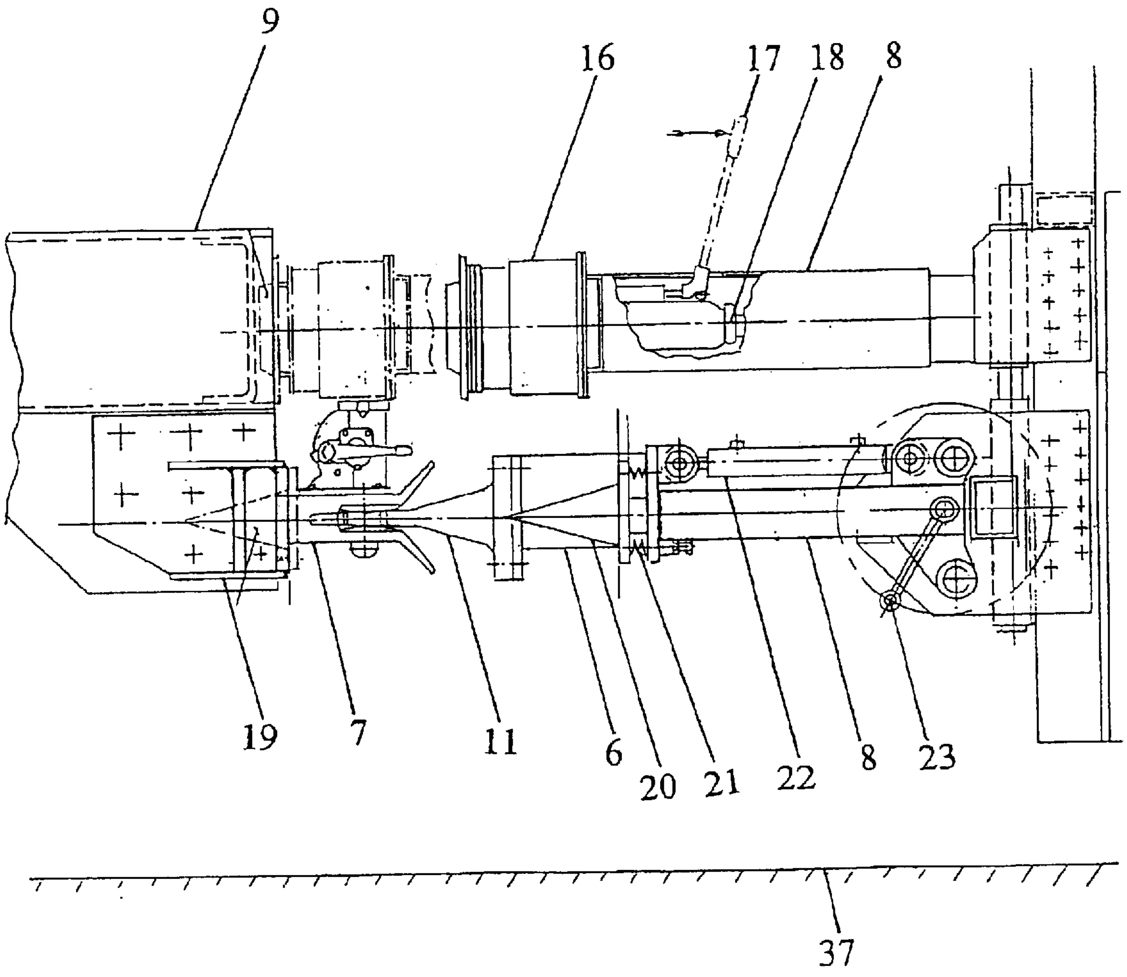
FIG. 7 shows a second and a third embodiment of the coupling device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows an impact attenuating device (1) consisting of a connecting part (2), an attenuating part (3) and wheels (4). The connecting part is connected to a vehicle (5) by means of a drawbar (6) which is connected to the towing unit (7) of the vehicle. When the connecting part (2) is in transport position (FIG. 1), the device (1) is only connected via the towing unit (7) of the vehicle and can pivot on the towing unit (7) as the vehicle turns (FIG. 2), i.e. it functions like a trailer.

FIG. 3 shows the device (1) connected to the vehicle (5) in operating position. The drawbar (6) is retracted while at the same time two extensible beams (8) are pressed against the frame side members (9) of the vehicle. The pressure exerted on the frame side members (9) makes the device behave like a rigid extension of the vehicle. As the vehicle turns, the device follows in a rigid manner and sweeps over a surface outside its own lane (FIG. 4). For the wheels (4) not to be exposed to abnormal forces as the vehicle turns in operating position, the wheels (4) have a pivot function, i.e. the wheels (4) can rotate on a vertical axis like the wheels of a shopping trolley. When returning to the transport position, the pivot function is locked with the wheels (4) in the travelling direction. By frame side member is meant in this application text on the one hand the frame side members of the vehicle and, on the other hand, beams and components which are arranged adjacent to the frame side members and can transfer an essentially horizontal load to the frame side members.

FIG. 5 shows in more detail how the drawbar (6) is connected to the towing unit (7) of the vehicle. The drawbar (6) is telescopically extensible by means of a hydraulic cylinder (12). The drawbar is mounted round a beam (35) which is attached to a plate (33). To be able to adjust the drawbar to a towing unit (7) at different levels above the roadway (37), the drawbar (6) is vertically displaceable along the beam (35). The Figure illustrates the currently most frequently used towing unit in Sweden, a VBG trailer coupling. The towing unit has an expanded opening (36) into which a male part (11) provided with a hole is inserted. On the towing unit (7) there is also a locking device (10) which with a pin through holes transversely of the opening (36) and through the male part (11) secures the parts to each other without preventing horizontal pivoting on the pin or a certain degree of vertical pivoting depending on irregularities in the roadway.

FIGS. 6*a–c* illustrate a first embodiment of the coupling device between the beams (8) and the frame side members (9). In this case, the beams (8) are provided with a female part (14), and the frame side members with a male part (13). A locking device (15) secures the parts to each other. An advantage of this embodiment is that the female and male parts correspond to the same parts as are arranged on the towing unit (7) of the vehicle and the drawbar (6), in this case a VBG trailer coupling. Since the VBG trailer coupling of the beams is rotated through 90 degrees in relation to the vehicle towing unit, the coupling device can without difficulties take up oscillations in the vertical direction which arise when the wheels (4) of the attenuator roll over irregularities.

Figure 9A:
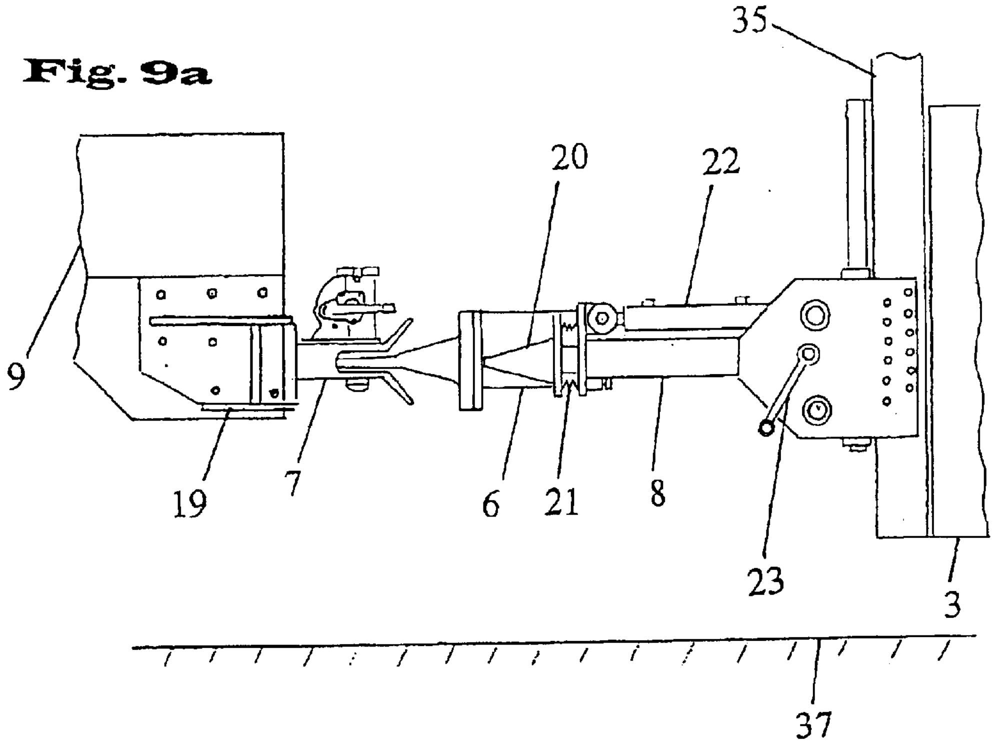
FIG. 9*a* is a side view of the third embodiment.
Figure 9B:
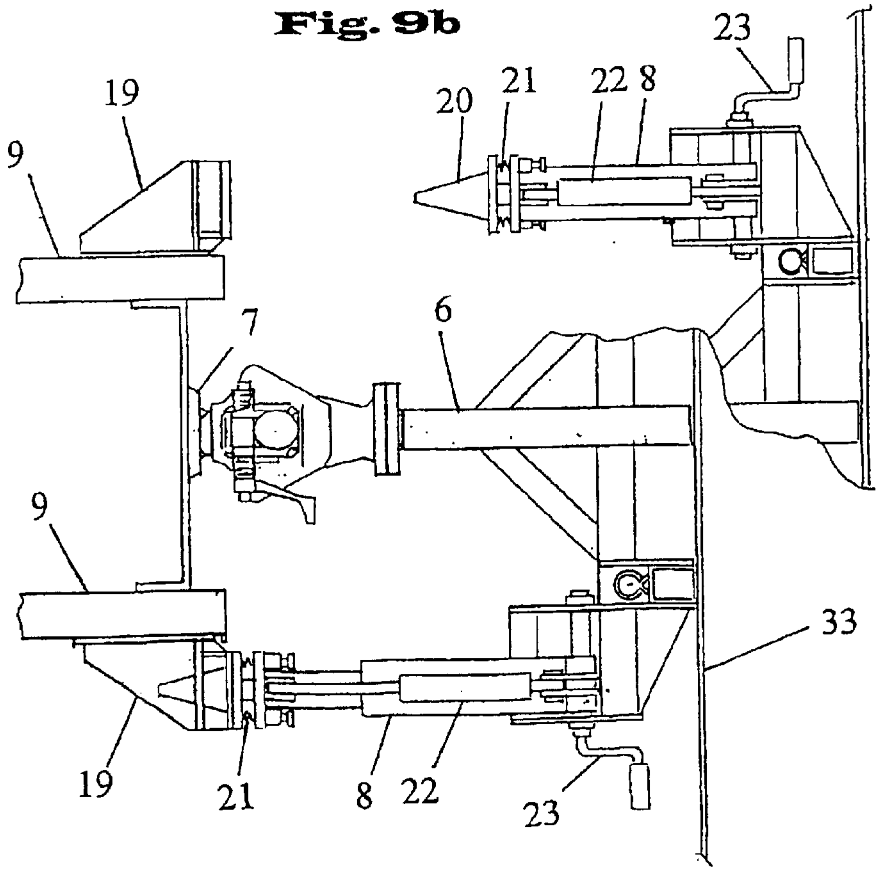
FIG. 9*b* is a top plan view of the third embodiment in transport and operating position.

Two other embodiments are shown in FIGS. 7–9. FIG. 7 illustrates both in the same Figure. In the upper part, a beam (8) is shown, which is pressed direct against the rear end of the frame side member (9) of the vehicle. The lower alternative has a conical male part (20) on the beam (8) which is pressed into a holder (19). The upper alternative requires no modification of the vehicle whereas the lower means that two holders (19) must be mounted on the frame side members. This is however a minor and inexpensive modification and gives an advantage by the possibility of arranging the beams (8) and the drawbar (6) in the same horizontal plane, which means that no bending moment in the vertical direction affects the towing unit and the drawbar in case of a collision.

The embodiment shown in FIGS. 8*a–b* is the simplest and requires no modifications of the vehicle. The connecting part comprises a telescopic drawbar (6) and two telescopic beams (8). Both the drawbar and the beams can be raised and lowered to fit different towing units and frame side member heights. The first time the attenuator is connected to a new vehicle, the pressure exerted on the frame side members is preset by means of a cylinder (18). The setting is carried out by the drawbar being shortened, after which the beams (8) are pressed against the frame side members with a suitable pressure by means of the cylinder (18). The cylinder (18) can be e.g. an ordinary lifting jack which is handled manually by means of a handle (17). Next time the attenuator is to take the operating position, the drawbar is shortened and the beams (8) are pressed against the frame side members using the preset pressure.

FIG. 9 illustrates the lower embodiment in FIG. 7. Two holders (19) are mounted on the frame side members (9). The holders have conical openings into which conical male parts (20) are inserted in operating position. The cone coupling (19, 20) provides a rigid and safe connection between vehicle and attenuator. For the beams (8) not to be subjected to excessive bending moment owing to irregularities in the roadway, a hinge (21) is placed between the male coupling (20) and the beam (8). The hinge (21) can be resilient in the vertical direction when the wheels (4) are rolling over irregularities. A hydraulic cylinder (22) controls the telescopic beam (8) and holds the coupling (19, 20) under pressure. To be able to adjust the connection (2) to vehicles with different distances between the frame side members, the beams (8) are horizontally movable by means of cranks (23).

FIGS. 10–12 illustrate the rear plate (26) of the attenuator with the wheel suspension mounted. The Figures illustrate an example with an adjustable spring system, which is especially usable together with the second embodiment of the coupling device. Since the beams and the drawbar in the second embodiment are not positioned in the same horizontal plane, a torque may arise which affects the rear end of the attenuator, which must be compensated for by means of the spring system. In the other embodiments of the coupling devices, both an adjustable spring system and an ordinary spring system without adjusting possibilities can be used. The wheel suspension in FIGS. 10–12 comprises a spring system (24) including shock absorbers with a control system (25). In transport position, when the attenuator is connected like a trailer, the spring system serves as an ordinary trailer spring system. In operating position, however, the shock absorbers are locked by means of the control system (25). The spring system is put out of operation, which means that the distance between the underside of the rear plate (26) and the roadway (37) is constant. This prevents a vehicle from striking under the rear plate (26) or too high up. The wheels (4) have two functions, a pivot position and a fixed position. The pivot position is used in operation, and the fixed position is used during transport. Conveniently the change of position is effected automatically by means of pneumatics when changing from transport to operation and vice versa. FIGS. 10 and 11 indicate the two functions of the wheels (4) by showing a fixed wheel (4) and one where the pivot function is indicated by showing the wheel (4) in the three different positions. In order to stabilise the entire device, use is made of a suspension device in the form of a wire 27 arranged in a zigzag under the attenuating part (3). The wire is fixed to the rear plate (26) and to the front plate (33). Turnbuckles (28) are used to stretch the wire (27). To prevent the wire from stopping or interfering with the deformation of the attenuating part in case of a collision, the wire is fixed to the front plate (33) in safety catches (29) which are released when exposed to strain from a collision, thus releasing a further part of the wire.

Figure 13A:
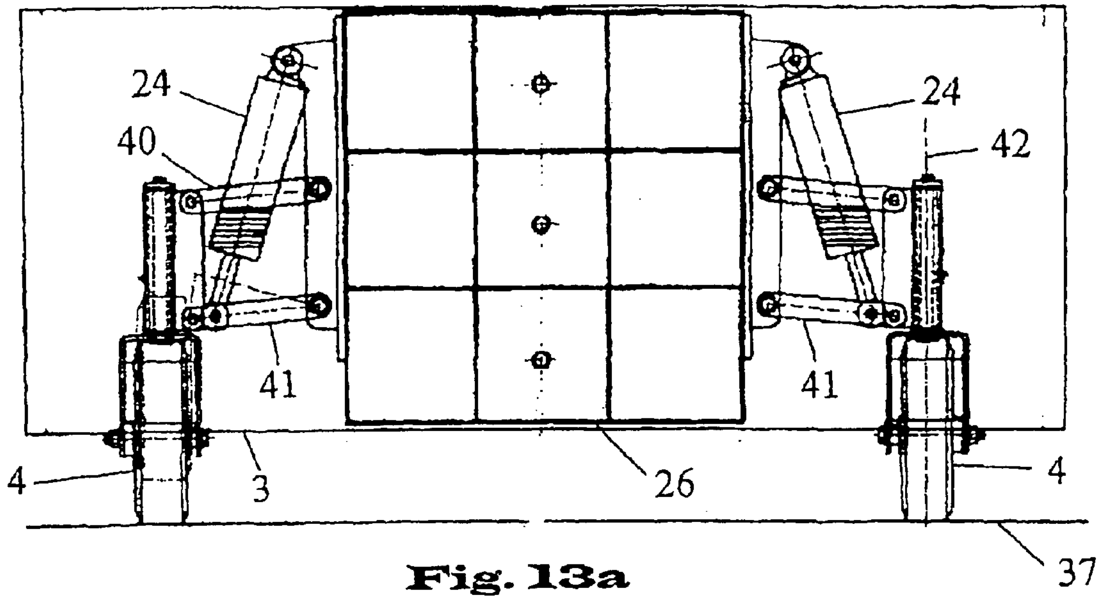
FIG. 13*a* is a rear view of a second embodiment of wheel suspension and spring system.
Figure 13B:
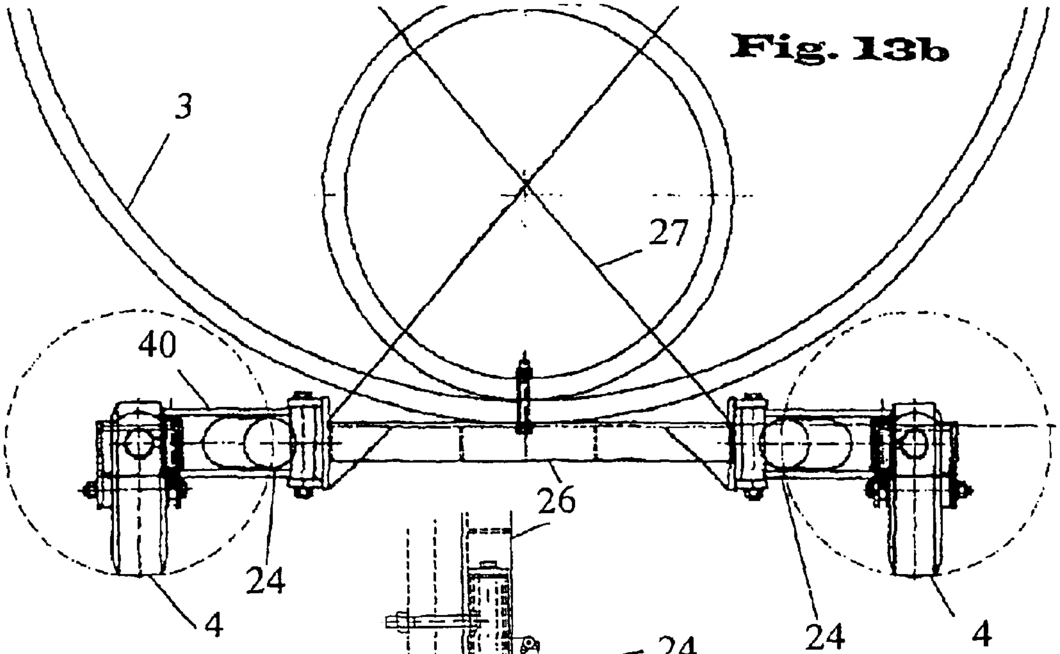
FIG. 13*b* as above seen from above.
Figure 13C:
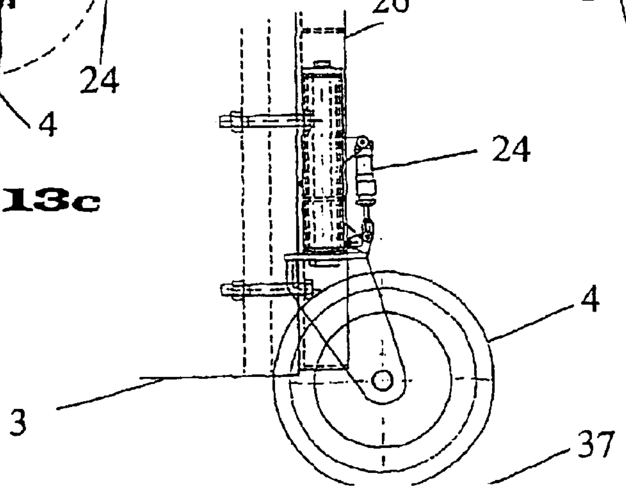
FIG. 13*c* as above, wheels from the side.

FIGS. 13*a–c* show a second embodiment of the spring system and the wheel suspension. In this case, the shock absorbers (24) have no control system. This gives the advantage of a less expensive and simpler system, which means that for instance ordinary motorcycle or car shock absorbers can be used. FIG. 13*a* also shows a wheel suspension comprising an upper link arm (40) and a lower link arm (41). The construction using two parallel link arms causes the pivot axis (42) always to be vertical. If the pivot axis is inclined from its vertical position, the wheels will be unevenly loaded, which increases wear. The wheel suspension with pairs of link arms can also be used with an adjustable spring system.

The attenuator is also provided with a holder (30) for traffic routing boards (31). The holder (30) is mounted on the plate (33) of the connecting part and consists of open square beams (35) into which the board (31) is inserted and secured. When the attenuator is driven like a trailer, the regulations applicable to trailers must be complied with. In transport position, the rear plate is therefore provided with signs and lighting for trailers. In operating position warning signs for service vehicles are provided. When large traffic routing boards are used, problems with stability during transport of the attenuator may in some cases arise, for instance in case of strong winds. This problem is solved by mounting supporting wheels or supporting rollers at the far end of the front plate (33). The wheels or rollers are mounted a distance above the roadway to provide support if the device tends to be inclined. Another solution is to mount a wheel axle with pivot wheels on the front plate (33) or the drawbar (6).

To prevent e.g. cyclists from being wedged in or under the attenuator, a guard can be used. FIGS. 10 and 11 illustrate a guard in the form of a wire (34) which extends from the outer end of the wheel suspension to the outer end of the front plate (33). However, the guard can advantageously be more complete in the form a plurality of wires, a metal sheet, net or the like. If a reusable attenuating part is used, it may also be convenient to protect the attenuating part from being damaged in case of a collision. A guard in the form of a shell round the wheel suspension can reduce the risk of holes and scratches in the material.

Figure 14:
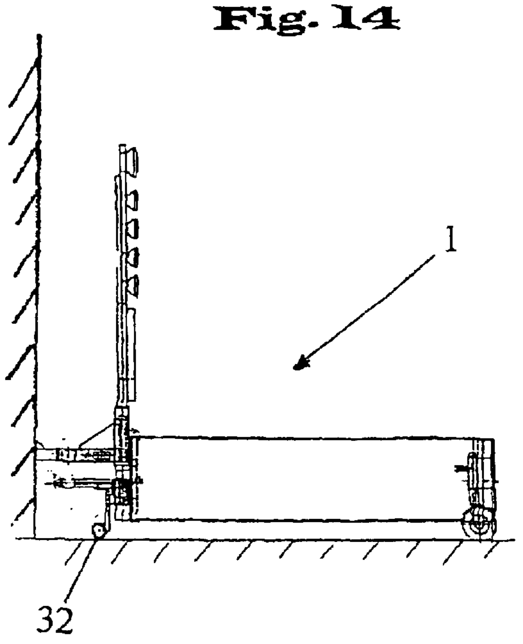
FIG. 14 shows the impact attenuating device against a stationary object.

The impact attenuating device can also be used without a vehicle for stationary use. FIG. 14 shows how the device is arranged against some kind of stationary construction or mound of earth. The Figure shows that the connecting part has supporting wheels (32) which are lowered when the device is used without a vehicle, parked or handled manually. These wheels are mounted with a quick coupling and can be removed to save weight when the device is connected to a vehicle.

Figure 15:
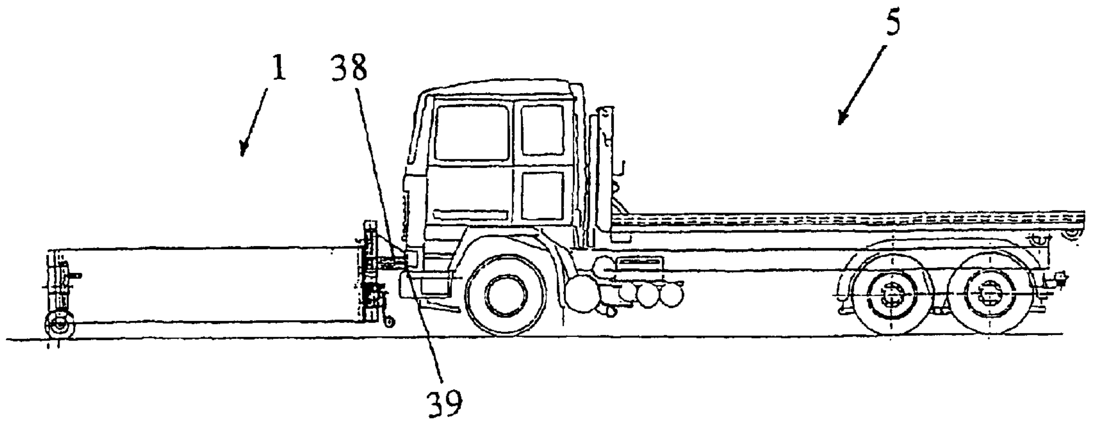
FIG. 15 shows the impact attenuating device mounted in front of the vehicle.

In some cases, there is a need to have an impact attenuating device in front of the vehicle, for instance when painting a centre line. FIG. 15 shows such an embodiment where the drawbar (6) has been removed and the beams (8) have been replaced by holders (38) suiting the plough mounting (39) of the vehicle.

Figure 16:
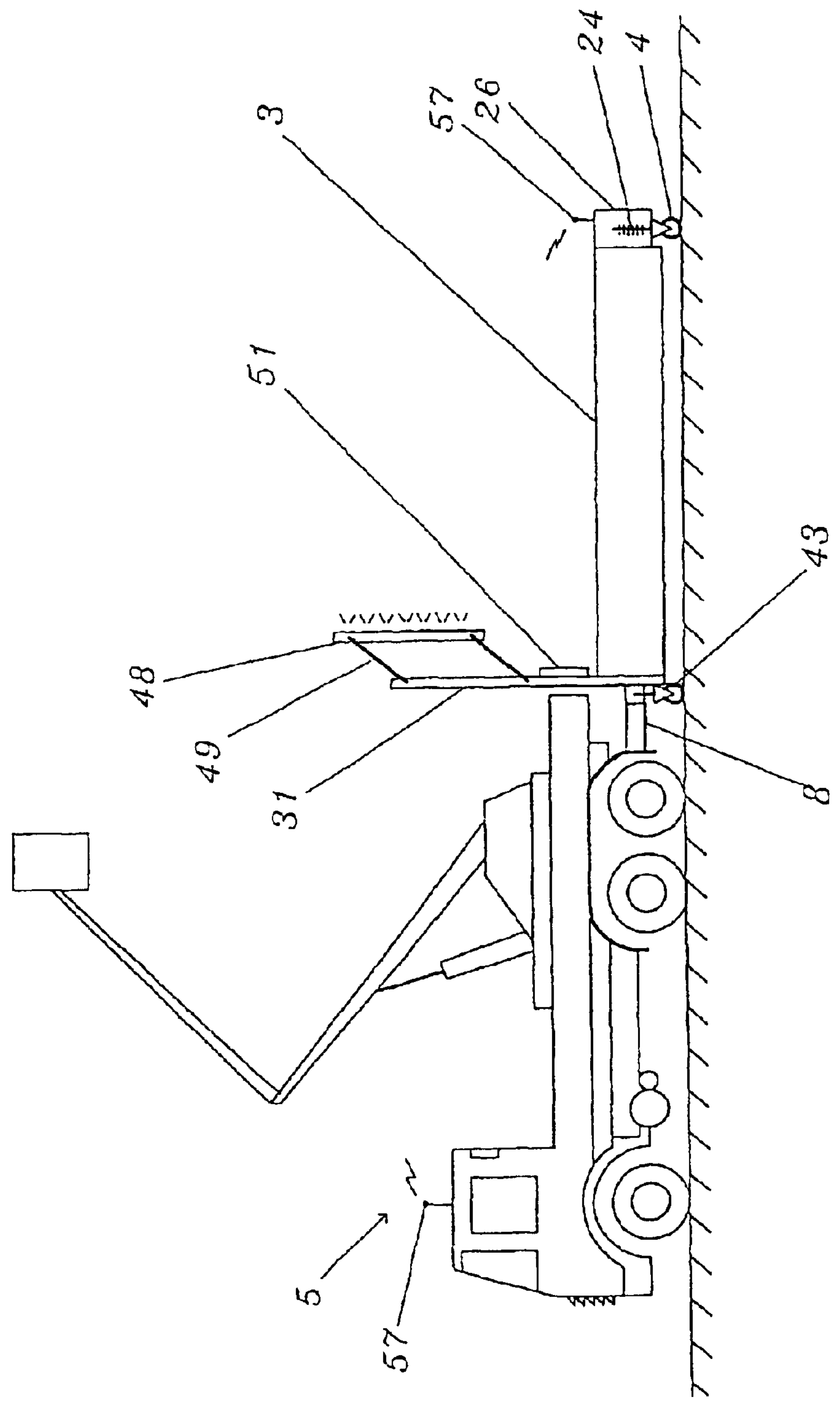
FIG. 16 shows an embodiment with wheels at the connecting part in operating position.

FIG. 16 shows an embodiment of the attenuator where pivot wheels (43) are arranged adjacent to the connecting part (2). The pivot wheels (43) are advantageously arranged on the plate (33) under the traffic routing board (31). These wheels preferably have some kind of spring system but do not need a locking function and are always in the pivot position. The attenuator is also provided with a vertically adjustable traffic routing board (31). In FIG. 16, the attenuator is in the operating position for e.g. exchange of road-lighting lamps, the traffic routing board (31) being raised to warn road-users. The traffic routing board (31) has arms (49) which control the motion up and down like a parallelogram. The arms (49) support a light board (48) with e.g. flash lamps and a light arrow. When the light board (48) is raised, also posteriorly situated boards (51) are to be seen, such as a roadwork board and a mandatory arrow. When the light board (48) is lowered (FIG. 17), these boards (51) are concealed behind the light board (48).

Figure 17:
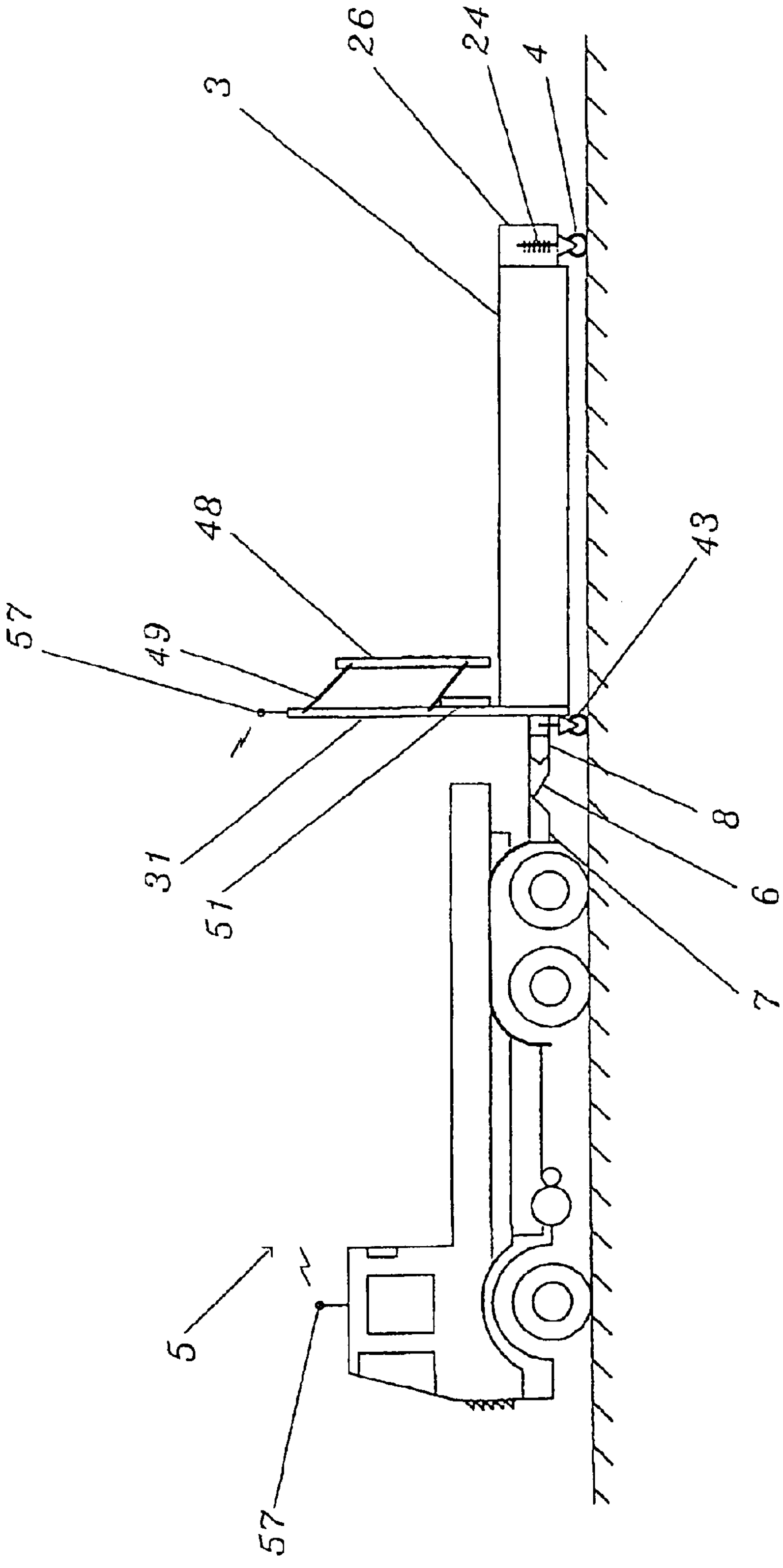
FIG. 17 embodiment as above in transport position.

FIG. 17 shows the same embodiment as above, but in transport position. The attenuator is connected to the vehicle (5) via the vehicle towing unit (7) and the drawbar (6). The front pivot wheels (43) are still in the pivot position whereas the pivot function of the rear wheels (4) is locked.

Figure 18:
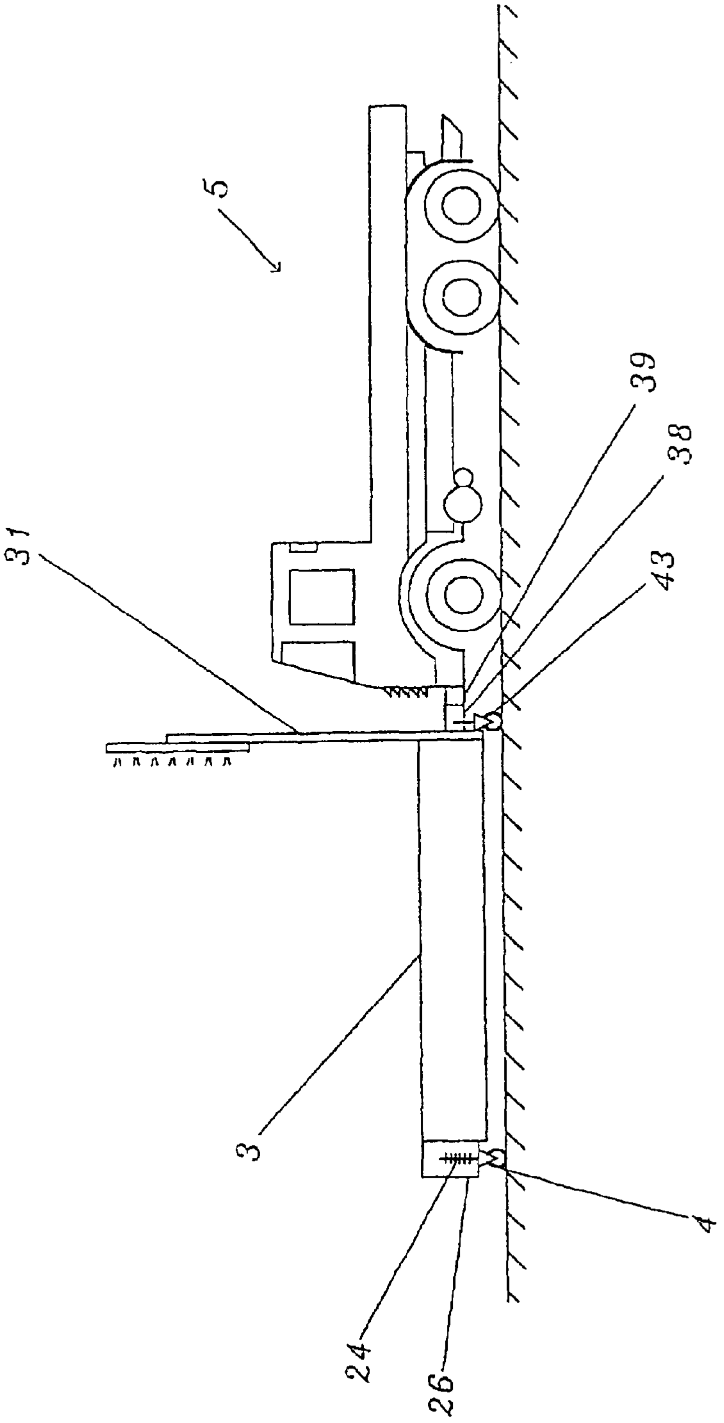
FIG. 18 connecting part with wheels mounted in front of the vehicle.
Figure 20:
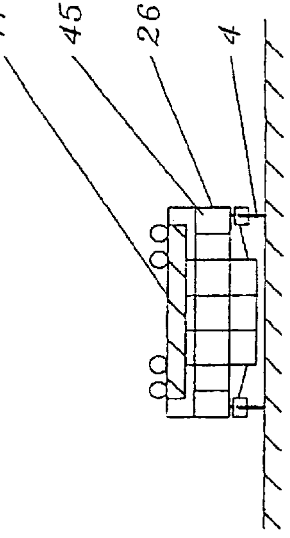
FIG. 20 as above seen from behind.

FIG. 18 shows like in FIG. 15 how the attenuator can be connected to the plough mounting (39) of the vehicle. When the attenuator is to be driven in front of the vehicle (5) a traffic routing board (31) is required, which does not obstruct the vehicle driver's view and in a suitable manner warns traffic coming the other way. For instance, the traffic routing board can be removed (see FIG. 15) while a light board or the like is arranged on the vehicle. It may also be appropriate to have warning signs behind the vehicle (5) or an attenuator (1) mounted in that place as well.

Figure 22:
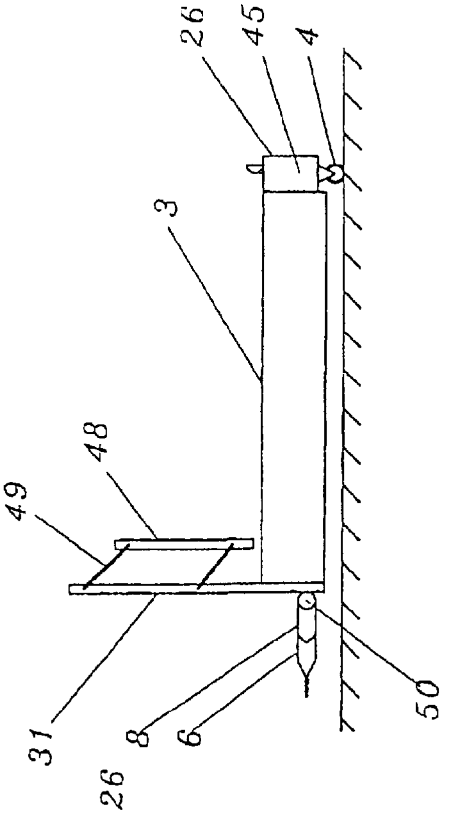
FIG. 22 as above seen from the side.
Figure 19:
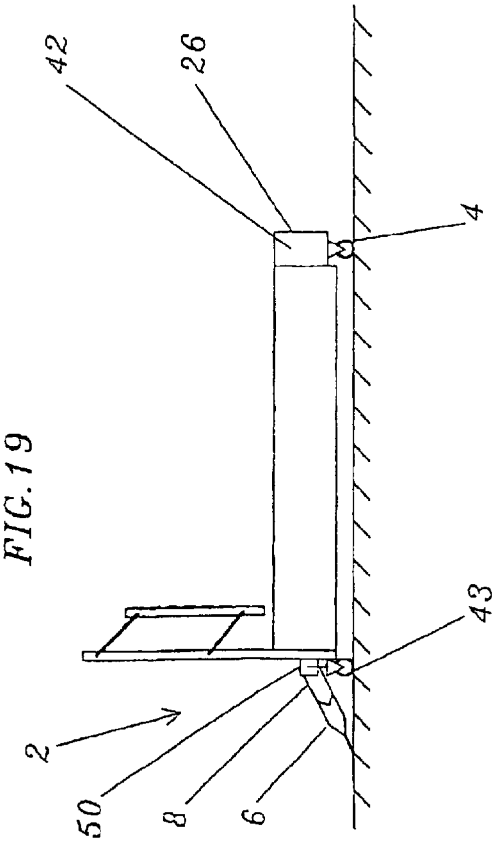
FIG. 19 connecting part with wheels without vehicle, seen from the side.
Figure 21:
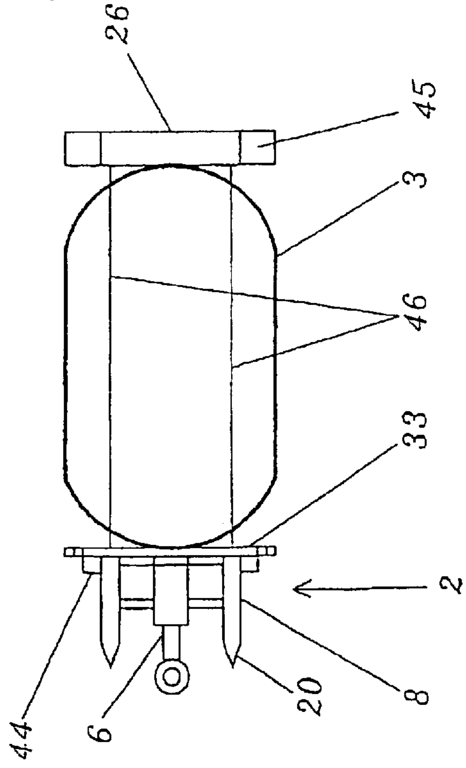
FIG. 21 as above seen from above.

FIGS. 19–22 illustrate one more embodiment of the connecting part (2) of the attenuator. The drawbar (6) and the beams (8) are connected to the attenuating part (3) by means of a hinge (50). FIG. 22 shows how the hinge (50) can be arranged on the front plate (33). In the Figure, the front pivot wheels (43) have been omitted to show more easily how the hinge (50) is arranged. The motion of the hinge in the vertical direction can also be restricted (see FIG. 23, a resilient restricting means (52)). By means of the hinge (50), the mounting of the attenuator on the vehicle is facilitated, and above all the attenuator will be less sensitive to variations in the driving conditions. However, a vertical adjustment of the drawbar (6) and the beams (8) must still be made so as to make them parallel with the towing unit (7) on the vehicle when they are connected. FIGS. 19–22 also show one more embodiment of the rear plate (26) with accessories. In this case the suspension consists of two parallel wires (46) from the rear plate (26) to the plate (33). A marking board (47) or sign with illumination is mounted on the rear plate (26). The rear plate is also widened so as to cover the entire width of the attenuating part (3). This means that the wheel suspension with spring system and locking etc. can be arranged protected within a cover (45). At the same time vehicles running into the attenuator strike a larger rear plate (26). This reduces the risk of the vehicle bouncing or sliding away from the attenuator without having been sufficiently attenuated.

Figure 23:
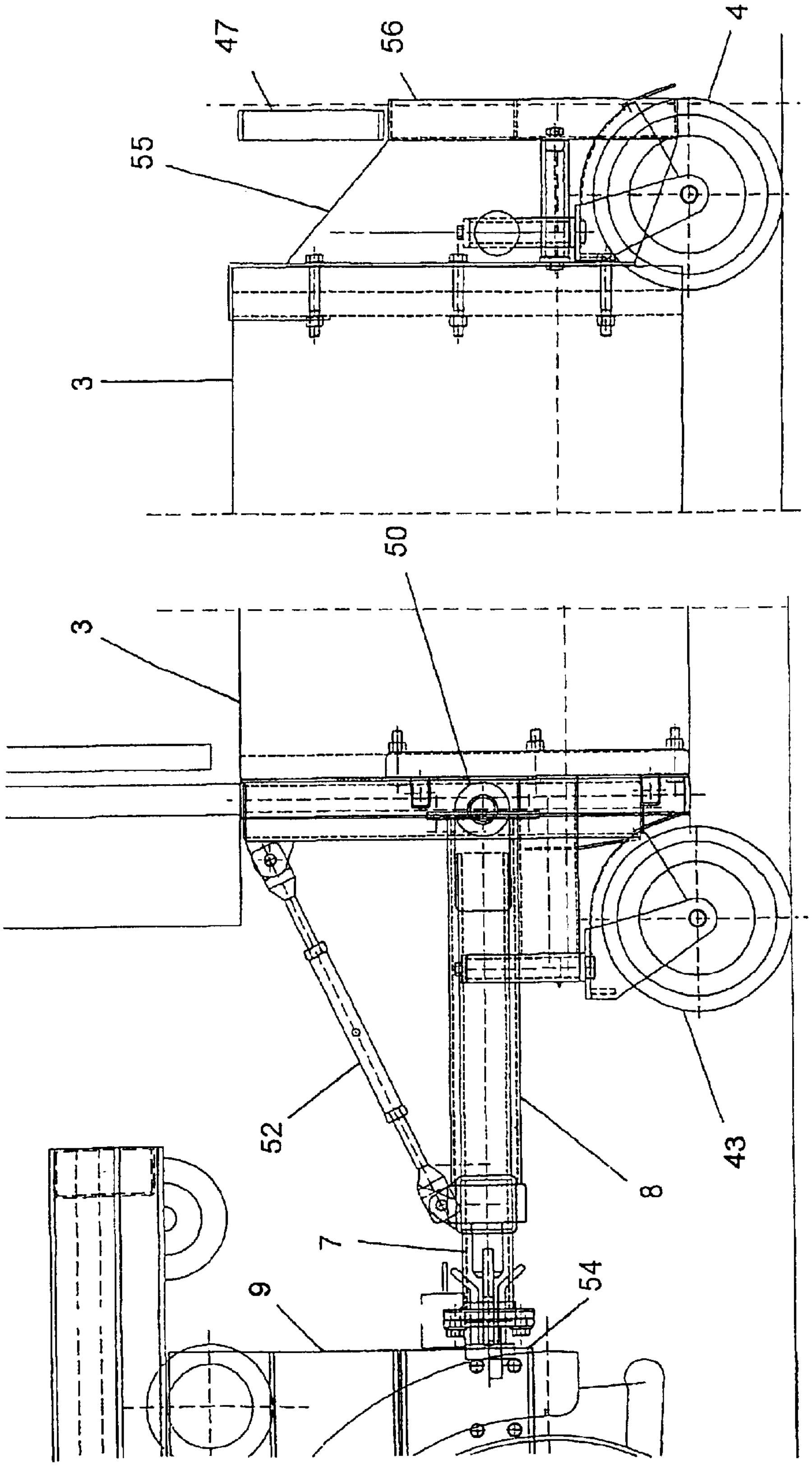
FIG. 23 embodiment with articulated drawbar and beams.
Figure 24:
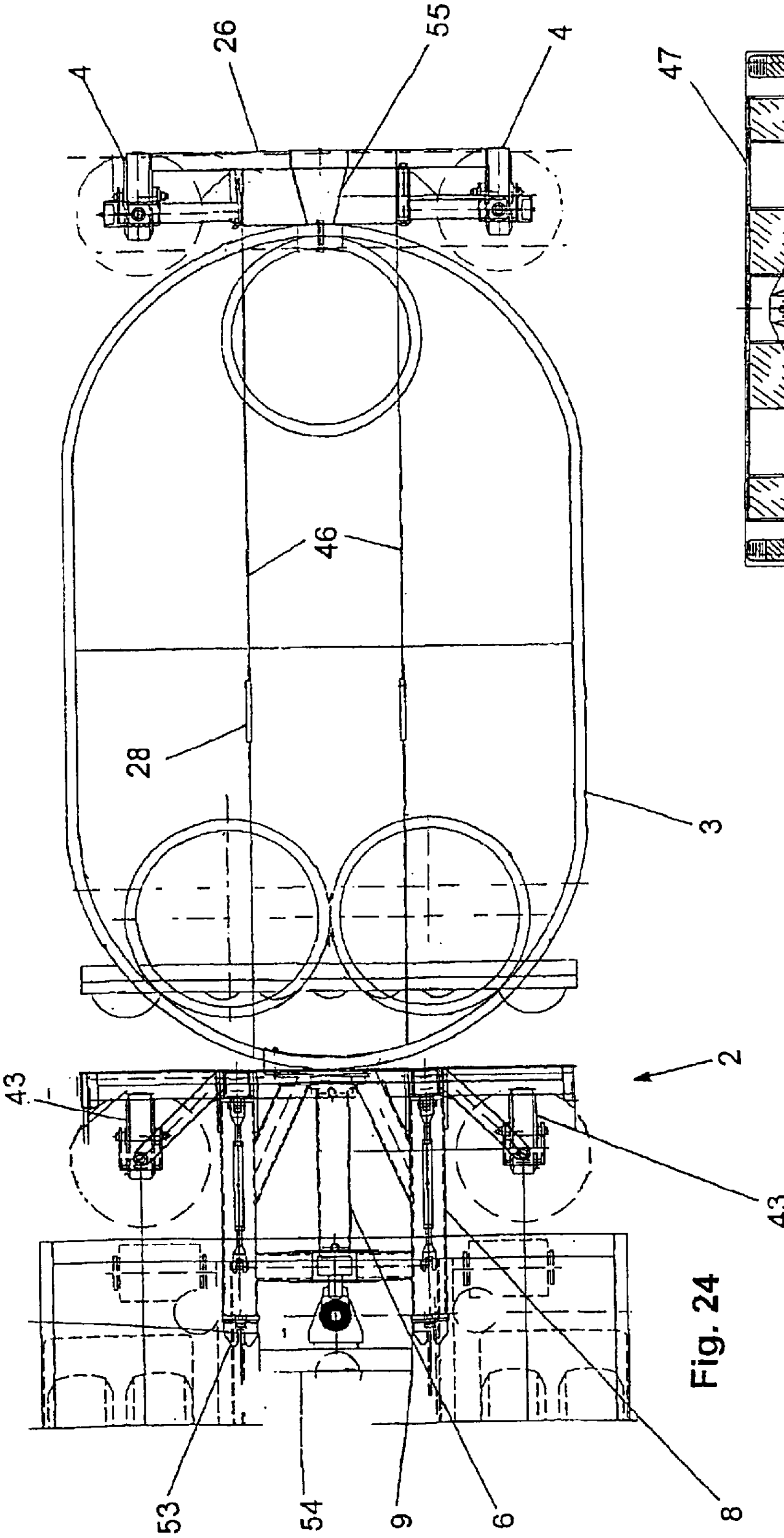
FIG. 24 as above, from above.
Figure 25:
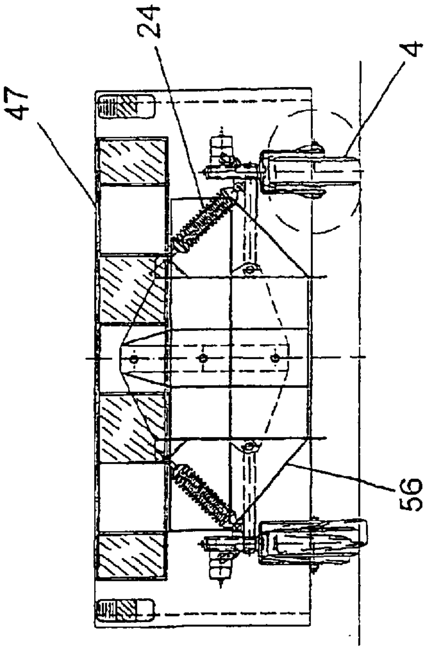
FIG. 25 as above, from behind.

FIGS. 23–25 illustrate a preferred embodiment of the attenuator with pivot wheels (43) arranged adjacent to the connecting part (2). The drawbar (6) consists of a hydraulic cylinder which together with the beams (8) are connected to the plate (33) by means of a hinge (50). In order to restrict the motion of the drawbar (6) and the beams (8) round the hinge (50), a resilient restricting means (52) is arranged between the plate (33) and the drawbar (6). The coupling device between the beams (8) and the frame side members (9) is simplified and consists of a fork-like part (53) at the outer end of the beams (8). The fork-like part (53) is conveniently designed for each individual vehicle in order to be as good a fit as possible. The fork-like part (53) surrounds the end of the frame side member, or a part associated with the frame side member, e.g. the beam for the vehicle towing unit (54). The inside of the fork-like part (53) is suitably covered with rubber, for instance by arranging a rubber block, thereby preventing metal from contacting metal in the connection. The stabilisation of the parts of the attenuator takes place by two parallel wires (46) arranged under the attenuating part (3). Moreover, a spacer (55) is arranged between the attenuating part (3) and the rear plate (26) to provide space for the rear wheels (4) behind the rear plate (26). The rear plate (26) comprises a striking plate (56) with a check pattern and a marking board (47). The striking plate (56) can be made wider so as to cover the wheels (4) with suspension. The two rows of squares can be extended, for example, by one or two squares. The wheels (4) are arranged in such manner that the rearmost part of the wheel cannot move behind the rear plate (26). This prevents a vehicle from striking a wheel (4), sliding up on the wheel (4) and missing or incorrectly hitting the striking plate (56). This construction makes the wheel suspension and the spring system (24) protected behind the plate (26), see FIG. 26, where the wheel suspension and the associated spring system (24) are shown behind the plate (26).

In order to avoid extensive wiring from the vehicle (5) to the attenuator (1) and all functions that are to be controlled, some kind of wireless communication (57), e.g. radio, is advantageously used. The driver of the vehicle is equipped with a radio transceiver which then communicates with transceivers arranged at the different functions, sign, drawbar, locking of the pivot function etc.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An impact attenuating device to be connected to a vehicle with frame side members, comprising an attenuating part, a pair of wheels and a connecting part, said connecting part including a pivot wheel and at least two beams for load take-up between the frame side members of the vehicle and the impact attenuating device, said connecting part being adapted to connect the attenuating device to the vehicle in an operating position, or in a transport position in which the impact attenuating device is connected as a trailer.

2. The impact attenuating device as claimed in claim 1, wherein the connecting part further includes an extensible drawbar which is connected to a towing unit on the vehicle.

3. The impact attenuating device as claimed in claim 2, wherein the drawbar is telescopic and adjusted hydraulically and/or manually.

4. The impact attenuating device as claimed in claim 2, wherein the beams and/or the drawbar are hingedly connected to the attenuating part by means of a hinge.

5. The impact attenuating device as claimed in claim 1, wherein the beams of the connecting part, in said operating position, abut against the frame side members of the vehicle in such manner that the vehicle and the impact attenuating device form a rigid unit.

6. The impact attenuating device as claimed in claim 5, wherein the connecting part further includes an extensible drawbar which is connected to a towing unit on the vehicle, said beams being pressed against the frame side members with a preset pressure by shortening of the drawbar.

7. The impact attenuating device as claimed in claim 1, wherein the beams of the connecting part, in operating position, are connected to the frame side members of the vehicle by a coupling device.

8. The impact attenuating device as claimed in claim 7, wherein the coupling device includes conical female parts on the frame side members, into which conical male parts on the beams are inserted.

9. The impact attenuating device as claimed in claim 7, wherein the coupling device includes male parts on the frame side members into which female parts on the beams are inserted.

10. The impact attenuating device as claimed in claim 9, wherein the coupling device includes a fork-like part on the beams.

11. The impact attenuating device as claimed in claim 7, wherein the coupling device includes a locking device for securing the beams to the frame side members.

12. The impact attenuating device as claimed in claim 9, wherein the female and male parts of the coupling device correspond to a trailer towing unit.

13. The impact attenuating device as claimed in claim 7, wherein the beams are telescopic beams which can be longitudinally adjusted and include a resilient hinge which takes up bending moments caused by vertical variations in the roadway.

14. The impact attenuating device as claimed in claim 1, wherein the pair of wheels in operation have a pivot function which is locked during transport.

15. The impact attenuating device as claimed in claim 1, wherein the pair of wheels have a spring system.

16. The impact attenuating device as claimed in claim 15, wherein the spring system includes a control system which in operation can lock the spring system.

17. The impact attenuating device as claimed in claim 1, wherein a mounting is provided for traffic routing and/or road sign boards.

18. The impact attenuating device as claimed in claim 17, wherein the connecting part includes holders for different combinations of said boards.

19. The impact attenuating device as claimed in claim 1, wherein a suspension device is provided in the form of a wire which connects the pair of wheels, the attenuating part and the connecting part.

20. The impact attenuating device as claimed in claim 19, wherein the wire is provided with a catch which can release a further part of the wire.

21. The impact attenuating device as claimed in claim 1, wherein one or more functions of said device are controlled by a wireless communication device.

22. A method of transporting and using an impact attenuating device connected to a vehicle having frame side members, comprising the steps of pivotally connecting the impact attenuating device to the vehicle for pulling thereof as a trailer during transport; and rigidly connecting the impact attenuating device to said vehicle during operation, said device including two beams for load take-up between the frame side members of the vehicle and the impact attenuating device to prevent pivoting between the vehicle and the device during operation.

23. The method as claimed in claim 22, wherein the connection during transport is made to a towing unit of the vehicle, and in operation said impact attenuating device is connected to the towing unit or a plough mounting of the vehicle.

24. An impact attenuating device connected to a vehicle having frame side members, said impact attenuating device comprising an attenuating part, a pair of wheels and a connecting part including a drawbar and at least two beams for load take-up between the frame side members of the vehicle and the attenuating part, said impact attenuating device being selectively connected to said vehicle in an operating position, in which the beams of said connecting part abut against the frame side members of the vehicle such that said vehicle and said impact attenuating device form a rigid unit, or in a transport position in which the impact attenuating device is pivotally connected to said vehicle through said drawbar and pulled as a trailer.

* * * * *